United States Patent [19]

Mouton

[11] Patent Number: 5,423,174
[45] Date of Patent: Jun. 13, 1995

[54] ANTI-ICING SYSTEM FOR A GAS TURBINE ENGINE

[75] Inventor: Pierre C. Mouton, Grigny, France

[73] Assignee: Societe National d'Etude et de Construction de Moteurs d'Aviation (S.N.E.C.M.A.), Paris, France

[21] Appl. No.: 249,728

[22] Filed: May 26, 1994

[30] Foreign Application Priority Data

Jun. 3, 1993 [FR] France ................... 93 06635

[51] Int. Cl.⁶ .......................................... F02C 7/047
[52] U.S. Cl. ..................... 60/39.093; 60/736
[58] Field of Search ............. 60/39.093, 730, 736, 60/39.821, 39.07

[56] References Cited

U.S. PATENT DOCUMENTS

| | | |
|---|---|---|
| 2,970,437 | 2/1961 | Anderson . |
| 3,123,283 | 3/1964 | Leis ............................. 60/39.093 |
| 3,874,168 | 4/1975 | Toure ........................... 60/39.281 |
| 3,981,466 | 9/1976 | Shah . |
| 4,041,697 | 8/1977 | Coffinberry et al. ........ 60/39.093 |
| 4,073,136 | 2/1978 | Symon .......................... 60/39.093 |
| 4,404,793 | 9/1983 | Coffinberry ................. 60/39.07 |
| 4,485,619 | 12/1984 | Moore et al. . |
| 4,546,604 | 10/1985 | Moore et al. . |
| 4,783,026 | 11/1988 | Rumford et al. ............ 60/39.093 |
| 4,999,994 | 3/1991 | Rüd et al. . |

FOREIGN PATENT DOCUMENTS

| | | |
|---|---|---|
| 2454522 | 11/1980 | France . |
| 3828834 | 11/1989 | Germany . |
| 321658 | 6/1957 | Switzerland . |
| 720012 | 12/1954 | United Kingdom . |
| 2072268 | 9/1981 | United Kingdom . |
| 2147364 | 5/1985 | United Kingdom ........... 60/39.093 |

Primary Examiner—Tinmothy S. Thorpe
Attorney, Agent, or Firm—Bacon & Thomas

[57] ABSTRACT

An anti-icing system to prevent the formation of ice on, or to remove ice from selected portions of a gas turbine engine is disclosed that is not directly dependent upon the mode or speed of operation of the gas turbine engine. The system has a heat exchanger into which flows a tapped portion of air from the compressor and fuel from the engines fuel supply system. The fuel supply system includes a fuel return circuit which connects the fuel pump outlet to the fuel pump inlet so as to return or recycle fuel to the fuel pump inlet when the engine demand for fuel is low, such as under lower power operating conditions. This recycling of the fuel raises the temperature of the fuel such that, in the heat exchanger, heat is transferred to the tapped portion of the air from the compressor thereby raising the temperature of such tapped air such that it may be directed onto selected portions of the gas turbine engine to either prevent formation of ice, or to remove ice from these portions. Under high speed engine operating conditions, such as full power, the engines demand for fuel is greater resulting in less fuel recycling and lower fuel temperature. Under these conditions, the temperature of the fuel is lower than that of the air tapped from the compressor resulting in heat transfer from the tapped air to the fuel. This lowers the temperature of the tapped air so as to prevent damage to the forward engine bearings onto which the air may be directed to prevent ice formation.

6 Claims, 2 Drawing Sheets

ANTI-ICING SYSTEM FOR A GAS TURBINE ENGINE

BACKGROUND OF THE INVENTION

The present invention relates to an anti-icing system for a gas turbine engine, more particularly such a system which utilizes air bled from the engine compressor to de-ice the forward portion of the gas turbine engine.

When in flight, aircraft will encounter varying atmospheric conditions, some of which, depending upon the geographical location, the season and the flight altitude, may cause ice to form on the aircraft and portions of the aircraft engine. Under such icing conditions, the turbo-jet engine takes in cold and moist air which may form ice on some of the engine components. The amount of ice formed will depend on various meteorological parameters and features of the aircraft engine. Components located in the front portion of the gas turbine engine, in particular the engine shaft dome or nose and the forward lip of the engine intake housing are susceptible to icing and are insufficiently exposed to dynamic centrifugal forces which might otherwise protect them from substantial ice accumulation in prolonged flights.

A conventional solution to either prevent or eliminate the effects of icing on engine components utilizes heated air tapped or bled from the gas turbine engine compressor. The state of the art is typified by U.S. Pat. No. 3,981,466 which discloses an anti-icing system for the intake lip which includes directly aiming the tapped or bled air from the compressor onto the forward edge of the lip. The temperature of the bled or tapped air varies in direct relationship to the engine speed. The air temperature is relatively low under lower power operating conditions and is relatively high under full power operating conditions. Accordingly, this anti-icing system has low efficiency under lower power operating conditions.

In order to prevent ice build-up, or remove ice from the gas turbine engine nose or dome, air bled from the compressor may be directed onto this portion of the engine. However, the air bled from the engine compressor under full power operating conditions is extremely hot and must be cooled before being directed onto this portion of the gas turbine engine to prevent damage to the front bearing and/or the turbofan due to overheating. To overcome this problem, as noted in U.S. Pat. Nos. 4,485,619 and 4,546,604, air circulation is established in a closed system due to the rotation of the engine shaft nose or dome. As in the previous system, the anti-icing capacity of these systems is a direct function of the mode of operation of the gas turbine engine.

SUMMARY OF THE INVENTION

An anti-icing system to prevent the formation of ice on, or to remove ice from selected portions of a gas turbine engine is disclosed that is not directly dependent upon the mode or speed of operation of the gas turbine engine. The system has a heat exchanger into which flows a tapped portion of air from the compressor and fuel from the engines fuel supply system. The fuel supply system includes a fuel return circuit which connects the fuel pump outlet to the fuel pump inlet so as to return or recycle fuel to the fuel pump inlet when the engine demand for fuel is low, such as under lower power operating conditions. This recycling of the fuel raises the temperature of the fuel such that, in the heat exchanger, heat is transferred to the tapped portion of the air from the compressor thereby raising the temperature of such tapped air such that it may be directed onto selected portions of the gas turbine engine to either prevent formation of ice, or to remove ice from these portions. Under high speed engine operating conditions, such as full power, the engines demand for fuel is greater resulting in less fuel recycling and lower fuel temperature. Under these conditions, the temperature of the fuel is lower than that of the air tapped from the compressor resulting in heat transfer from the tapped air to the fuel. This lowers the temperature of the tapped air so as to prevent damage to the forward engine bearings onto which the air may be directed to prevent ice formation.

The heat exchanger may be in communication with the fuel return circuit, or may be connected to the fuel outlet conduit downstream of the fuel pump. By maintaining the temperature of the tapped air relatively constant throughout the engine operating range, the tapped air may be directed onto the intake lip of the engine, or the rotary parts such as the engine nose dome without fear of causing damage to any of the engine components.

The invention is based upon the insight that the fuel temperature is a function of the gas turbine engine mode or speed of operation which varies inversely with the air temperature at the compressor outlet. At low power, the fuel is relatively hot due to the fuel being recycled through the fuel pump several times. On the other hand, at full power, there is a greater demand for fuel and the fuel remains relatively cold because only a small amount is recycled through the fuel pump. Accordingly, it is possible to regulate the anti-icing air temperature to maintain a substantially constant magnitude by appropriately sizing the heat exchanger.

If the bled or tapped air passes through a zone which includes the front bearing of the gas turbine engine, the heat exchanger is preferably located between the bleeding means and the zone for the purpose of preventing ice from forming on the nose or dome cowl. According to the invention, the bearing and the fan disk are not subjected to excessive temperatures of tapped air.

DETAILED DESCRIPTION OF THE PREFERRED EMBODIMENTS

Figure 1:
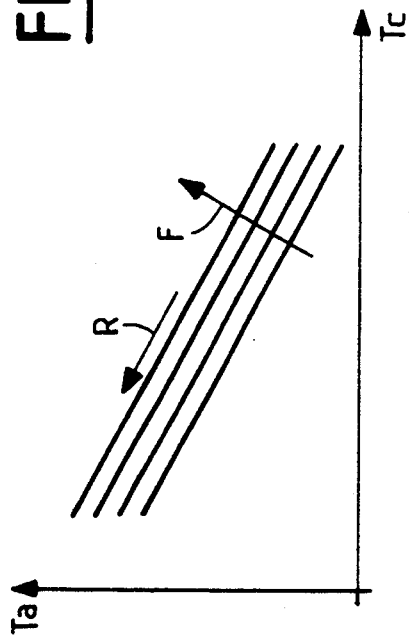
FIG. 1 is a graph showing the temperatures of air bled from the compressor as a function of the operational mode of the gas turbine engine and of the ambient air.
Figure 3:
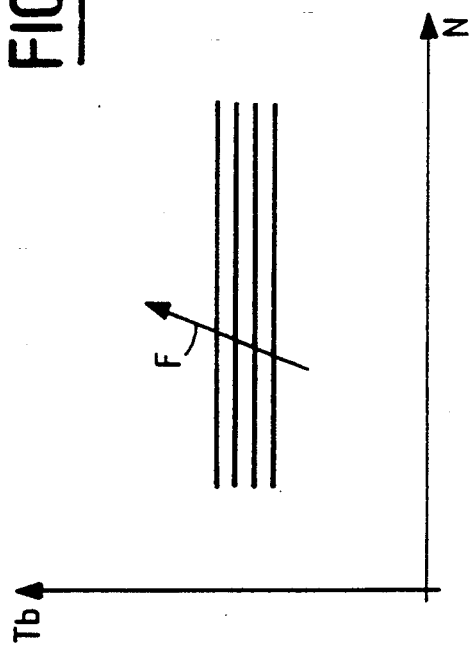
FIG. 3 is a graph showing the temperatures of the air bled from the compressor and of the temperature of the fuel at various ambient temperatures.
Figure 2:
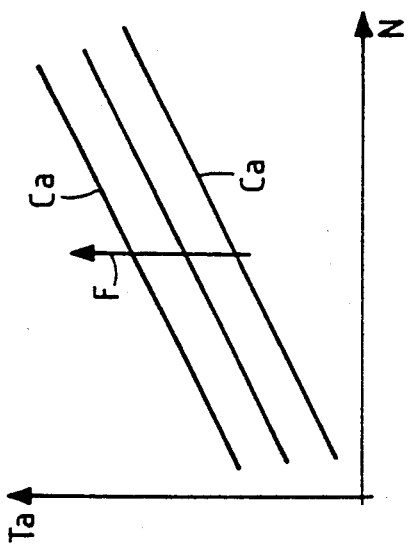
FIG. 2 is a graph showing the fuel temperature as a function of the operational mode of the gas turbine engine.

FIGS. 1 through 3 show the temperatures Ta of the air bled from the compressor of the gas turbine engine and the temperatures Tc of the fuel fed to the combustion chamber as a function of the operational mode, or speed, N of the gas turbine engine and as a function of the ambient air temperature at the engine fan intake. The arrow F shows how these functions are shifted as the ambient temperature rises, while the arrow R (FIG. 3) illustrates the shift of the point of the function shown when the engine operational speed or mode increases. As illustrated in FIG. 1, the temperature Ta of the air bled from the compressor is relatively cool under low power engine operating conditions and is relatively hot under full power operating conditions. The function Cc illustrated in FIG. 2 shows that the fuel temperature Tc is relatively hot under low power operating conditions Ra and is relatively cold under full power operating conditions Pc. Under lower power engine operating conditions, there is less demand for fuel and, since the fuel pump output is constant, the excess fuel must be recycled through the fuel pump. Typically, the fuel may be recycled approximately forty times to thereby substantially increase its temperature. Under full power operating conditions, on the other hand, the engine's demand for fuel is very high and, therefore, very little fuel recycling takes place causing the fuel temperature to remain relatively cold.

According to the invention, a fuel-bleed air heat exchanger 4 is inserted into the engine fuel circuit 5 and in the anti-icing air circuit 1 between the bleed or tap 2 of the compressor and the feed means 3 for the bled air which directs the bled air onto a front portion of the gas turbine engine. The heat exchanger 4 is sized according to the following parameters: a) at high engine power, the tapped or bled air is cooled in the heat exchanger by transferring heat to the fuel, which is subsequentially heated; and b) under lower power engine operating conditions, the heat transfer is reversed, by transferring heat from the fuel to the lower temperature tapped air, the air is heated while the fuel is cooled.

Figure 4:
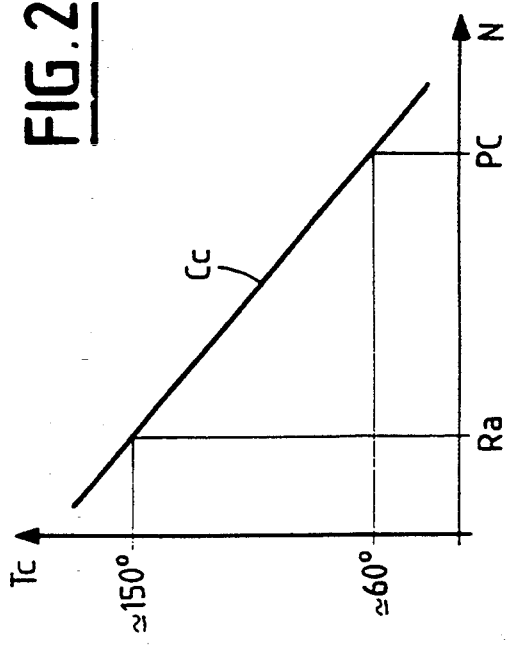
FIG. 4 is a graph showing the temperature of the bled air downstream of the heat exchanger as a function of the operational mode of the engine at various ambient temperatures.

The anti-icing air at the exit of heat exchanger 4 can be regulated at a substantially constant temperature Tb regardless of engine speed or mode of operation N as illustrated in FIG. 4.

The presence of the heat exchanger 4 avoids any possible overheating of the front portion of the engine, thereby increasing the reliability of the gas turbine engine. Inter-circuit leaks between the two systems through the heat exchanger can be detected by any known means.

The thermal characteristics of the heat exchanger 4 are determined from the optimization of the aircraft flight pattern, taking into account the limitations on the fuel circuit 5 and the air circuit 1.

Figure 5:
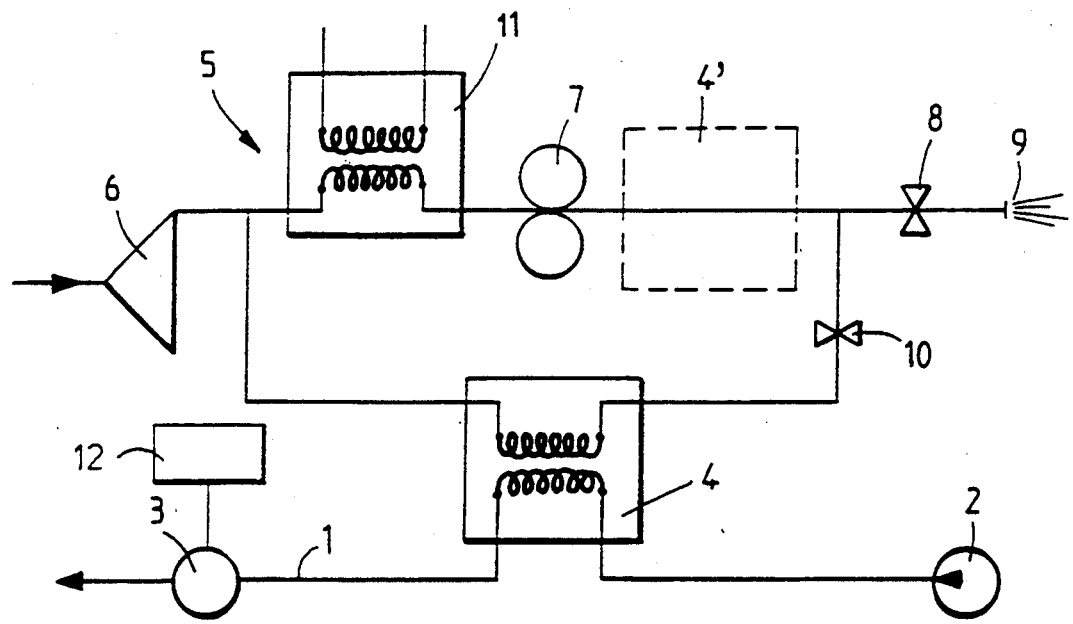
FIG. 5 is a schematic diagram of a first embodiment of the system according to the present invention.
Figure 6:
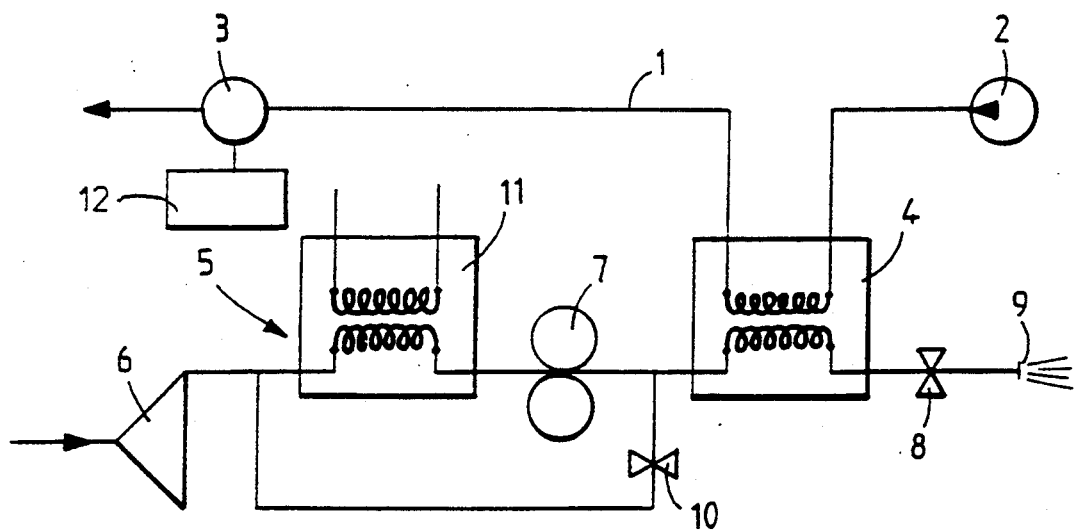
FIG. 6 is a schematic diagram of a second embodiment of the system according to the present invention.

FIGS. 5 and 6 show specific designs of the present invention. In these figures, 6 denotes the low pressure pump feeding the fuel circuit 5 which also comprises a high pressure pump 7, a fuel meter 8 and a fuel injector 9. The unused portion of the fuel is returned upstream of the high pressure pump 7 by means of a fuel return circuit including a control valve 10. 11 denotes an oil-fuel heat exchanger which exchanges heat between the fuel in circuit 5 and the engine oil lubrication system.

In FIG. 5, the heat exchanger 4 is located in parallel to the fuel circuit 5 and located in the fuel return circuit. The heat exchanger 4 may also be located in series downstream of the high pressure pump 7 and upstream of the fuel meter 8 such as illustrated in FIG. 6 or by reference 4' in FIG. 5.

The two illustrated circuits may also be combined and a valve may be used in the bled air circuit 1. The primary advantage of the system of the present invention is to avoid overheating of the critical portions of the gas turbine engine, such as the fan rotor or disk and the forward bearing of the gas turbine engine by maintaining a substantially uniform anti-icing air temperature regardless of engine operating conditions. Another advantage is the heating of the fuel under high-power operating conditions to protect it against icing and under lower operating conditions, both the engine fuel and oil will be cooled. The feed means 3 may also be connected to a regulation system 12 which may control the direction of the anti-icing air onto engine components which are most subject to icing under the given conditions encountered by the aircraft.

The foregoing description is provided for illustrative purposes only and should not be construed as in any way limiting this invention, the scope of which is defined solely by the appended claims.

I claim:

1. An anti-icing system to prevent the formation of ice on and remove ice from selected portions of a gas turbine engine having an air compressor and a fuel system including a low pressure fuel pump, and a high pressure fuel pump with an inlet and an outlet, the anti-icing system comprising:
   a) a liquid/air heat exchanger;
   b) means to tap a portion of air from the air compressor and pass the tapped air through the liquid/air heat exchanger;
   c) means to pass fuel emanating from the high pressure fuel pump outlet through the liquid/air heat exchanger in heat exchanging relationship with the tapped air passing through the liquid/air heat exchanger such that under higher power engine operation, the temperature of the tapped air exceeds the temperature of the fuel passing through the liquid/air heat exchanger whereby heat is transferred from the tapped air to the fuel, thereby lowering the temperature of the tapped air and under low power engine operation the temperature of the tapped air is lower than that of the fuel passing through the liquid/air heat exchanger whereby heat is transferred to the tapped air thereby raising the temperature of the tapped air;
   d) fuel conduit means connecting the low pressure fuel pump to the high pressure fuel pump inlet;
   e) a fuel return circuit connecting the fuel pump outlet and to the fuel conduit means between the low pressure fuel pump and the high pressure fuel pump inlet so as to return fuel to the high pressure fuel pump inlet when the engine demand for fuel is low; and,
   f) means for directing the tapped air from the liquid/air heat exchanger onto the selected portions of the gas turbine engine.

2. The anti-icing system of claim 1 wherein the liquid/air heat exchanger is located in the fuel return circuit.

3. The anti-icing system of claim 1 further comprising a fuel delivery conduit connected to the high pressure fuel pump outlet wherein the fuel delivery conduit passes through the liquid/air heat exchanger.

4. The anti-icing system of claim 1 wherein the gas turbine engine has a forward bearing and further comprising means to direct at least a portion of the tapped air from the liquid/air heat exchanger onto the forward bearing.

5. The anti-icing system of claim 4, wherein the liquid/air heat exchanger is located between the air compressor and the forward bearing.

6. The anti-icing system of claim 1 further comprising regulation means connected to the means for directing the tapped air onto the selected portions of the gas turbine engine.

* * * * *